United States Patent [19]

Liu

[11] Patent Number: 6,160,723
[45] Date of Patent: Dec. 12, 2000

[54] CHARGE PUMP CIRCUIT INCLUDING LEVEL SHIFTERS FOR THRESHOLD VOLTAGE CANCELLATION AND CLOCK SIGNAL BOOSTING, AND MEMORY DEVICE USING SAME

[75] Inventor: Tz-yi Liu, Cupertino, Calif.

[73] Assignee: Micron Technology, Inc., Boise, Id.

[21] Appl. No.: 09/259,234

[22] Filed: Mar. 1, 1999

[51] Int. Cl.[7] .................................................... H02M 3/18
[52] U.S. Cl. ............................................ 363/60; 327/536
[58] Field of Search ...................... 363/59, 60; 327/535, 327/536

[56] References Cited

U.S. PATENT DOCUMENTS

| 5,341,334 | 8/1994 | Maruyama | 365/189.11 |
| 5,363,066 | 11/1994 | Chen et al. | 331/17 |
| 5,870,295 | 2/1999 | Watanabe | 363/60 |
| 5,940,284 | 8/1999 | Troutman | 363/60 |

OTHER PUBLICATIONS

Wang et al., "Efficiency Improvement in Charge Pump Circuits," in *IEEE Journal of Solid State Circuits*, vol. 32, No. 6, pp. 852–860, Jun. 1997.

Kawahara et al., "Bit-Line Clamped Sensing Multiplex and Accurate High Voltage Generator for Quarter-Micron Flash Memories," in *IEEE Journal of Solid State Circuits*, vol. 31, No. 11, pp. 1590–1600, Nov. 1996.

*Primary Examiner*—Matthew Nguyen
*Attorney, Agent, or Firm*—Dorsey & Whitney LLP

[57] ABSTRACT

A charge pump circuit includes feedback level shifters for providing threshold voltage cancellation and feedforward level shifters for providing boosted clocking signals to generate a high pumped output voltage from a low supply voltage. The charge pump circuit includes plurality of switching circuits each including first and second signal terminals and a control terminal adapted to receive a control signal. Each switching circuit couples its first signal terminal to its second signal terminal responsive to the control signal. The signal terminals of the plurality of switching circuits are connected in series between an input voltage node and an output voltage node. A plurality of energy storage circuits each have a first terminal coupled to a respective voltage node formed by the interconnection between adjacent switching circuits and a second terminal adapted to receive a clocking signal. At least one feedback level shifting circuit is coupled between a selected one of the voltage nodes and the control terminal of a switching circuit between the selected voltage node the input node, each feedback level shifting circuit applying the voltage on the voltage node to the control terminal responsive to a clock signal. At least one feedforward level shifting circuit is coupled between a selected one of the voltage nodes and the second terminal of one of the energy storage circuits coupled to a voltage node between the selected voltage node and the output node. Each feedforward level shifting circuit applies the voltage on the voltage node to the second terminal responsive to a clock signal.

43 Claims, 6 Drawing Sheets

CHARGE PUMP CIRCUIT INCLUDING LEVEL SHIFTERS FOR THRESHOLD VOLTAGE CANCELLATION AND CLOCK SIGNAL BOOSTING, AND MEMORY DEVICE USING SAME

TECHNICAL FIELD

The present invention relates to voltage generating circuits, and, more particularly, to a method and circuit for providing threshold voltage cancellation and clock signal boosting to generate a relatively large pumped output voltage from a low input voltage.

BACKGROUND OF THE INVENTION

In many electronic circuits, charge pump circuits are utilized to generate a positive pumped voltage having an amplitude greater than that of a positive supply voltage, or to generate a negative pumped voltage from the positive supply voltage, as understood by those skilled in the art. For example, a typical application of a charge pump circuit is the generation of a programming voltage $V_{PP}$ utilized to program data into memory cells in non-volatile electrically block-erasable or "FLASH" memories, as will be understood by those skilled in the art. A charge pump may also be utilized in a conventional dynamic random access memory ("DRAM"), to generate a boosted word line voltage $V_{CCP}$ having an amplitude greater than the amplitude of a positive supply voltage $V_{CC}$ or a negative substrate or back-bias voltage $V_{bb}$ that is applied to the bodies of NMOS transistors in the DRAM.

Figure 1:
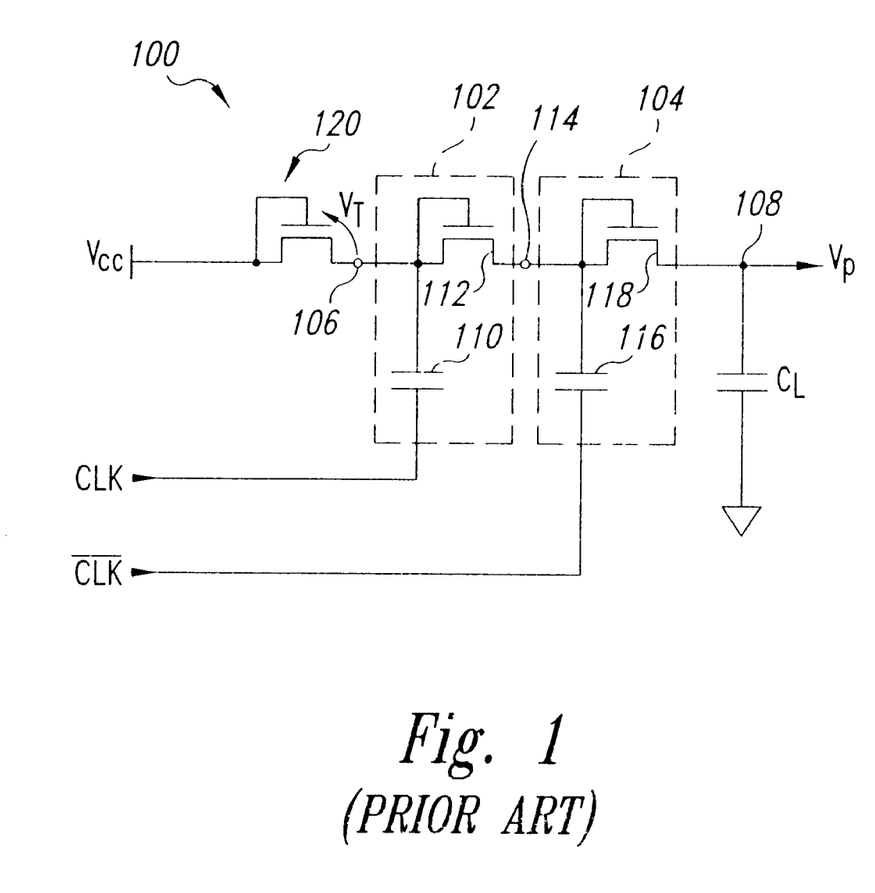
FIG. 1 is a schematic of a conventional charge pump circuit.

FIG. 1 is a schematic of a conventional two-stage charge pump circuit 100 that generates a pumped output voltage $V_P$ having an amplitude greater than the amplitude of a supply voltage source $V_{CC}$ in response to complementary clock signals CLK and $\overline{CLK}$, as will be described in more detail below. The charge pump circuit 100 includes two voltage-boosting stages 102 and 104 connected in series between an input voltage node 106 and an output voltage node 108. The voltage-boosting stage 102 includes a capacitor 110 receiving the clock signal CLK on a first terminal and having a second terminal coupled to the input node 106. A diode-coupled transistor 112 is coupled between the input voltage node 106 and a voltage node 114, and operates as a unidirectional switch to transfer charge stored on the capacitor 110 to a capacitor 116 in the second voltage-boosting stage 104. The capacitor 116 receives the complementary clock signal $\overline{CLK}$, and a diode-coupled transistor 118 operates as a unidirectional switch to transfer charge stored on the capacitor 116 to a load capacitor $C_L$ coupled between the output voltage node 108 and ground. A diode-coupled transistor 120 is coupled between the supply voltage source $V_{CC}$ and node 106, and operates as a unidirectional switch to transfer charge from the supply voltage source $V_{CC}$ to the capacitor 110. As understood by those skilled in the art, the clock signals CLK and $\overline{CLK}$ are complementary signals so there is a phase shift of 180° between the clock signals.

Figure 2:
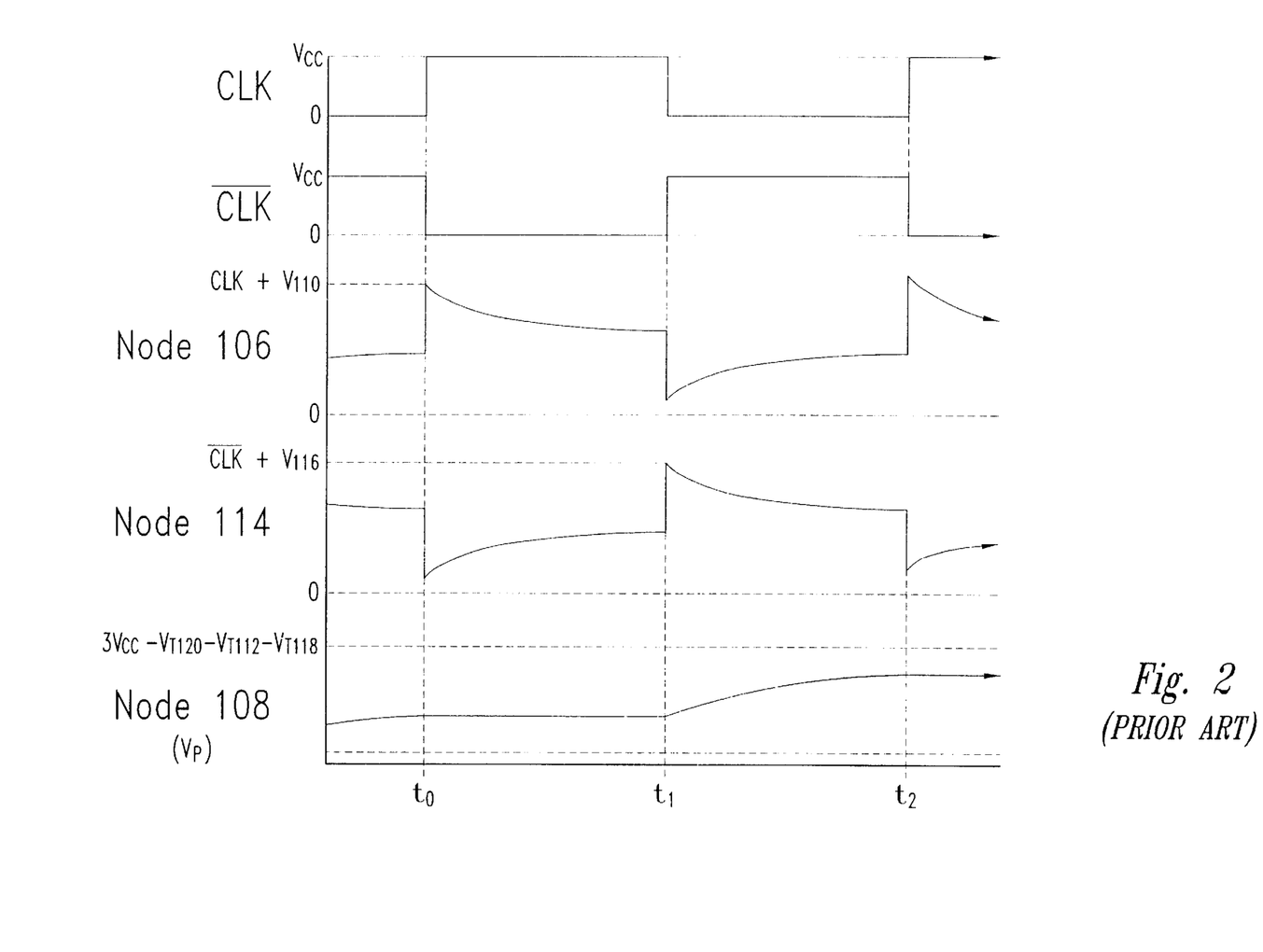
FIG. 2 is a signal diagram illustrating the operation of the charge pump circuit of FIG. 1.

The operation of the conventional charge pump circuit 100 of FIG. 1 will now be described in more detail with reference to the timing diagram of FIG. 2, which illustrates the voltages at various points in the charge pump circuit 100 during operation. At just before a time $t_0$, the CLK signal is low having a voltage of approximately 0 volts and the $\overline{CLK}$ signal is high having a voltage of approximately the supply voltage $V_{CC}$, and each of the voltages on the nodes 106, 114, and 108 have assumed values as shown for the sake of example. When the CLK signal is low, the terminal of the capacitor 110 is accordingly at approximately ground and the voltage at the node 106 of the diode-coupled transistor 120 is the threshold voltage $V_T$ less than the supply voltage $V_{CC}$. As a result, the capacitor 110 is charged to $V_{CC}$ less $V_T$. As shown in FIG. 2, the voltage at the node 106 (i.e., the voltage across the capacitor 110) is increasing just before the time to as the capacitor 110 is being charged. Also just before the time to, the voltage at the node 114 equals the high voltage of the $\overline{CLK}$ signal plus the voltage stored across the capacitor 116. This bootstrapped voltage on the node 114 is sufficiently greater than the voltage $V_P$ on the output voltage node 108 to turn ON the transistor 118, transferring charge from the capacitor 116 through the transistor 118 to charge the load capacitor $C_L$. As shown, the voltage at node 114 is decreasing and the voltage $V_P$ increasing just before the time $t_0$ as charge is being transferred through the transistor 118.

At the time to, the CLK signal goes high, driving the voltage on the node 106 to the high voltage ($V_{CC}$) of the CLK signal plus the voltage stored across the capacitor 110 ($V_{110}$). At this point, the voltage on the node 106 is sufficiently high to turn OFF the transistor 120 isolating the node 106 from the supply voltage source $V_{CC}$. Also at the time to, the $\overline{CLK}$ signal goes low (to ground), causing the voltage on the node 114 to equal the voltage $V_{116}$ stored across the capacitor 116. The voltage on the node 106 is now sufficiently greater than the voltage on the node 114 to turn ON the transistor 112, transferring charge from the capacitor 110 through the transistor 112 to the capacitor 116. As shown in FIG. 2, between the time $t_0$ and a time $t_1$, which corresponds to the interval the CLK signal is high and $\overline{CLK}$ signal is low, the voltage at the node 106 decreases and the voltage at the node 114 increases as charge is pumped or transferred through the transistor 112. It should be noted that during this time, the transistor 118 is turned OFF because the voltage $V_P$ is sufficiently greater than the voltage at the node 114 during normal operation of the charge pump circuit 100.

At the time $t_1$, the CLK and $\overline{CLK}$ signals go low and high, respectively, and the charge pump circuit 100 operates in the same manner as previously described for just before the time $t_0$. In other words, the transistor 112 turns OFF and transistors 118 and 120 turn ON, and charge is transferred from the supply voltage source $V_{CC}$ through the transistor 120 to the capacitor 110 and charge is transferred from the capacitor 116 through the transistor 118 to the load capacitor $C_L$. As seen in FIG. 2, from the time $t_1$, to a time $t_2$ the voltage at the node 106 increases as the capacitor 110 is charging and the voltages on nodes 114 and 108 decrease and increase, respectively, as charge is transferred from the capacitor 116 to the load capacitor $C_L$. At the time $t_2$, the CLK and $\overline{CLK}$ signals again go high and low, respectively, and the charge pump circuit 100 operates as previously described at the time $t_0$.

The charge pump circuit 100 continues operating in this manner, pumping charge from the supply voltage source $V_{CC}$ to the successive capacitors 110, 116, and $C_L$ to develop the desired pumped voltage $V_P$ across the capacitor $C_L$. In the charge pump circuit 100, the maximum value of the voltage $V_P$ equals $3V_{CC} - V_{T120} - V_{T112} - V_{T118}$ where the voltages $V_{T120}$, $V_{T112}$, and $V_{T118}$ are the threshold voltages of the transistors 120, 112, and 118, respectively. Thus, the threshold voltages of these transistors reduce the voltage gain ($V_P/V_{CC}$) of the charge pump circuit 100. To alleviate this problem, more stages may be added to the charge pump circuit 100, but this increases the overall size, complexity, and power consumption of the circuit. Furthermore, in conventional charge pump circuits, as the amplitude of the pumped voltage $V_P$ increases the threshold voltages of the diode-coupled transistors in later stages increase due to the "body effect" of these MOS transistors. As understood by one skilled in the art, the body effect of a MOS transistor is the effect different source-to-substrate voltages have on the threshold voltage $V_T$ of the transistor. The body effect results in the threshold voltage $V_T$ of a MOS transistor increasing as the reverse bias voltage applied across the source-to-substrate junction increases in magnitude. In the charge pump circuit 100 of FIG. 1, the substrates for each of the transistors 120, 112, and 118 are typically coupled to ground. Thus, as the voltage increases on the successive sources of the transistors 120, 112, and 118, the respective threshold voltages $V_{T120}$, $V_{T112}$, and $V_{T118}$ increase accordingly. For example, the voltage on the node 108 is greater than the voltage on the node 106, and thus the source-to-substrate voltage of the transistor 118 is greater than that of the transistor 120 and accordingly the threshold voltage $V_{T118}$ of the transistor 118 will be greater than the threshold voltage $V_{T120}$ of the transistor 120. The increased values for the threshold voltages $V_T$ of transistors in later stages of the charge pump circuit 100 reduce the voltage gain of the charge pump circuit.

The supply voltages of modern electronic devices are steadily decreasing in an effort to reduce the power consumption of such devices. As the amplitude of the supply voltage source $V_{CC}$ becomes smaller, the voltage gain of conventional charge pump circuits may be substantially decreased by the threshold voltages of the diode-coupled transistors, particularly by those transistors in later stages as previously described. In fact, as the amplitude of the supply voltage source $V_{CC}$ approaches the magnitude of the threshold voltages, no voltage gain may be possible since the diode-coupled transistors 120, 112, and 118 may never turn ON. For example, if $V_{CC}$ equals 1 volt and $V_{T120}$ equals 1 volt, even when the node 106 is at ground the transistor 120 will not turn ON to charge the capacitor 110.

There is a need for a charge pump circuit having a relatively small number of voltage-boosting stages that generates a relatively large pumped output voltage from a low supply voltage.

SUMMARY OF THE INVENTION

According to one aspect of the present invention, a charge pump circuit comprises a plurality of switching circuits each including first and second signal terminals and a control terminal adapted to receive a control signal. Each switching circuit couples its first signal terminal to its second signal terminal responsive to the control signal. The signal terminals of the plurality of switching circuits are connected in series between an input voltage node and an output voltage node. A plurality of energy storage circuits each have a first terminal coupled to a respective voltage node formed by the inter connection between adjacent switching circuits. Each of the plurality of storage circuits has a second terminal adapted to receive a clocking signal, and each energy storage circuit develops a voltage across its first and second terminals that is a function of energy stored in the circuit. The charge pump circuit includes at least one feedback level shifting circuit coupled between a selected one of the voltage nodes and the control terminal of a switching circuit between the selected voltage node and the input node. Each feedback level shifting circuit applies the voltage on the voltage node to the control terminal responsive to a clock signal.

According to a second aspect of the present invention, the charge pump circuit may also include one feedforward level shifting circuit coupled between a selected one of the voltage nodes and the second terminal of one of the energy storage circuits coupled to a voltage node between the selected voltage node and the output node. Each feedforward level shifting circuit applies the voltage on the selected voltage node to the second terminal responsive to a clock signal. Each of the plurality of switching circuits may comprise a MOS transistor when the pumped circuit is generating a positive pumped output voltage, and may comprise a PMOS transistor when the pump circuit is generating a negative pumped output voltage. According to another aspect of the present invention, the charge pump circuit is contained in a FLASH memory for generating a programming voltage $V_{PP}$ that is used to program data into memory cells.

DETAILED DESCRIPTION OF THE INVENTION

Figure 3:
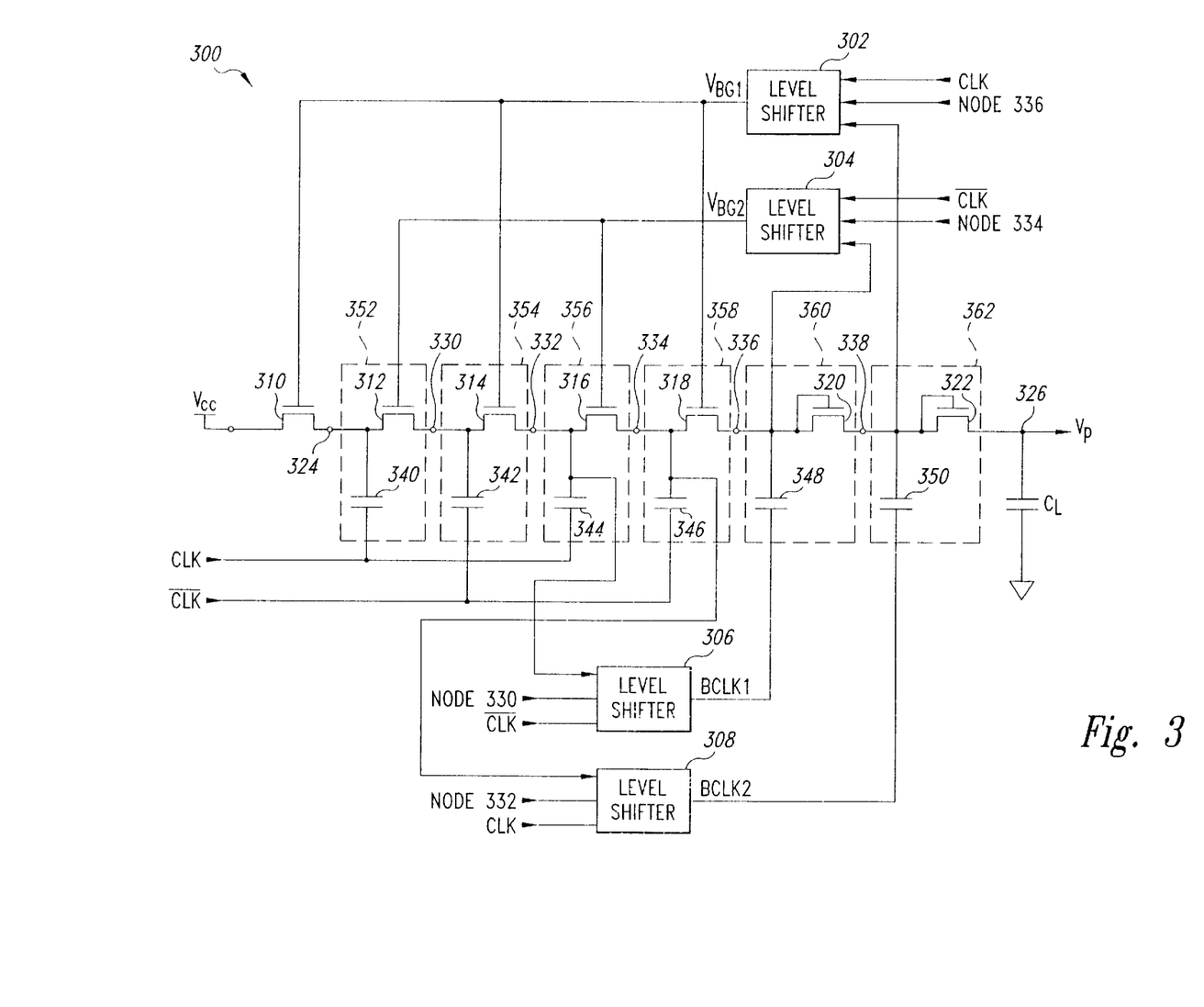
FIG. 3 is a schematic illustrating a charge pump circuit according to one embodiment of the present invention.

FIG. 3 is a schematic of a charge pump circuit 300 including a plurality of voltage-boosting stages 352–362, a pair of feedback level shifters 302 and 304, and a pair of feedforward level shifters 306 and 308 according to one embodiment of the present invention. In operation, the feedback level shifters 302 and 304 feedback respective boosted voltages to the gates of NMOS transistors in earlier stages of the charge pump circuit 300 so that the source of those transistors can be driven to the full voltages placed on their drains, thereby canceling the effects of the respective threshold voltages $V_T$ of MOS transistors in those stages. The feedforward level shifters 306 and 308 feed forward respective boosted voltages of earlier stages to clock later stages of the charge pump circuit to thereby reduce the total number of stages required to generate a desired pumped output voltage $V_P$ across a load capacitor $C_L$, as will be described in more detail below.

The voltage-boosting stages 352–362 include a plurality of NMOS transistors 312–322 and capacitors 340–350 connected as shown. The NMOS transistors 310–322 are connected in series between an input voltage node 324 and an output voltage node 326, with a plurality of intermediate voltage nodes 330–338 being formed by the interconnections between the stages 352–362 as indicated. In the charge pump circuit 300, only the final two stages 360 and 362 include the diode-coupled transistors 320 and 322 while the transistors 312–318 in all prior stages receive either a boosted gate signal $V_{BG1}$ from the feedback level shifter 302 or receive a boosted gate signal $V_{BG2}$ from the feedback level shifter 304. The feedback level shifter 302 applies the boosted gate signal $V_{BG1}$ to the gates of the transistors 314 and 318 responsive to a clock signal CLK and a control voltage on the node 336. The level shifter 302 also applies the boosted gate signal $V_{BG1}$ to the gate of an NMOS transistor 310 coupled between a supply voltage source $V_{CC}$ and the input voltage node 324. When the CLK signal is high, the level shifter 302 drives the boosted gate signal $V_{BG1}$ to approximately ground, turning OFF the transistors 310, 314, and 318.

When the CLK signal is low, the level shifter 302 drives the boosted gate signal $V_{BG1}$ to the voltage developed on the node 338 responsive to the control voltage on the node 336, thereby turning ON the transistors 310, 314, and 318. In the charge pump circuit 300, the voltages at the outputs of voltage-boosting stages 352–362 successively increase just as in the conventional charge pump circuit 100 previously described. As a result, the voltage developed on the node 338 and thus the boosted gate signal $V_{BG1}$ is sufficiently greater than the supply voltage $V_{CC}$ to cause each of the transistors 310, 314, and 318 to pass the full value of the voltage on its drain to its source, eliminating the threshold voltage $V_T$ loss experienced with conventional diode-coupled transistors. For example, if the transistor 310 was a diode-coupled transistor the maximum value to which that transistor could charge the capacitor 340 equals $V_{CC}$–$V_T$. In the charge pump circuit 300, however, the transistor 310 may now charge the capacitor 340 to the full value of the supply voltage $V_{CC}$ since the boosted gate voltage $V_{BG1}$ is now much greater than the supply voltage $V_{CC}$. In this way, the level shifter 302 provides threshold voltage $V_T$ "cancellation" by eliminating the effects of the respective threshold voltages $V_T$ of the transistors 310, 314, and 318 on the voltage gain of the pump circuit 300.

The feedback level shifter 304 operates in the same way as the level shifter 302 applying the boosted gate signal $V_{BG2}$ to the transistors 312 and 316 responsive to a complementary clock signal $\overline{CLK}$ and a control voltage on the node 334. When the $\overline{CLK}$ signal is high, the level shifter 304 drives the boosted gate signal $V_{BG2}$ to approximately ground turning OFF the transistors 312 and 316. When the $\overline{CLK}$ signal is LOW, the level shifter 304 drives the boosted gate signal $V_{BG2}$ to the voltage developed on the node 336 responsive to the control voltage on the node 334. Once again, the voltage developed on the node 336 is much greater than the supply voltage $V_{CC}$, and thus the transistors 312 and 316 turn ON and pass the full values of the respective voltages applied on their drains to their respective sources. In this way, the level shifter 304 cancels the effect of the respective threshold voltages $V_T$ of the transistors 312 and 316.

In the charge pump circuit 300, the voltage-boosting stages 352 and 356 are clocked by the CLK signal, and the voltage-boosting stages 354 and 358 are clocked by the $\overline{CLK}$ signal. In contrast to a conventional charge pump circuit, however, the voltage-boosting stages 360 and 362 are not clocked by the CLK and $\overline{CLK}$ signal, but instead are clocked by boosted clock signals BCLK1 and BCLK2 from the feedforward level shifters 306 and 308, respectively. More specifically, the level shifter 306 applies the boosted clock signal BCLK1 to the capacitor 348 responsive to the $\overline{CLK}$ signal and a control voltage on the node 330. When the $\overline{CLK}$ signal is high, the level shifter 306 drives the boosted clock signal BCLK1 low to approximately ground, and when the $\overline{CLK}$ signal is low, the level shifter 306 drives the BCLK1 signal to the voltage developed on the node 332 responsive to the control voltage on node 330. The voltage on the node 332 equals the high voltage of the CLK signal ($V_{CC}$) plus the voltage stored across the capacitor 344. Thus, when the $\overline{CLK}$ signal is low, the level shifter 306 clocks the capacitor 348 in the voltage-boosting stage 360 with the boosted clock signal BCLK1 having a voltage greater than the supply voltage $V_{CC}$. In other words, the level shifter 306 feeds the voltage on the node 332 forward to clock the voltage-boosting stage 360. This boosted clock signal BCLK1 increases the maximum voltage developed on the node 336 and thereby increases the maximum voltage to which the input node 338 of the next voltage-boosting stage 362 is charged, increasing the overall voltage gain of the charge pump circuit 300.

The feedforward level shifter 308 operates in the same way as the level shifter 306 to clock the capacitor 350 in the voltage-boosting stage 362 with the boosted clock signal BCLK2 to responsive to the CLK signal and a control voltage on the node 332. When the CLK signal is high, the level shifter 308 drives the boosted clock signal BCLK2 low to approximately ground, and when the CLK signal is low, the level shifter 308 drives the BCLK2 signal to the voltage developed on the node 334 responsive to the control voltage on node 332. The voltage on the node 334 equals the high voltage of the $\overline{CLK}$ signal ($V_{CC}$) plus the voltage stored across the capacitor 346, and thus the level shifter 308 clocks the capacitor 350 in the voltage-boosting stage 362 with the boosted clock signal BCLK2 having a voltage greater than the supply voltage $V_{CC}$. As previously described for the level shifter 306, this boosted clock signal BCLK2 increases the maximum voltage developed on the node 338 and thereby increases the maximum voltage to which the input node 338 of the next voltage-boosting stage 362 is charged, increasing the overall voltage gain of the charge pump circuit 300.

In operation, the charge pump circuit 300 alternately operates in an even-stage mode and an odd-stage mode responsive to the CLK and $\overline{CLK}$ signals to generate the pumped output voltage $V_p$, as will now be explained in more detail. In the following description, the means by which each of the voltage-boosting stages 352–362 boosts the corresponding voltage is substantially the same as in the charge pump circuit 100 previously described with reference to FIG. 1, and thus will not be described in more detail. Instead, the following description will explain operation of the feedback level shifters 302 and 304 in eliminating the effects of the respective threshold voltages $V_T$ of the transistors 310–318 to increase the respective voltage gains of the stages 352–358, and the operation of the feedforward level shifters 306 and 308 in increasing the overall voltage gain of the charge pump circuit 300.

The charge pump circuit 300 commences operation in the oddstage mode when the CLK signal goes high and the $\overline{CLK}$ signal goes low. As previously described, when the CLK signal is high, the feedback level shifter 302 drives the boosted gate signal $V_{BG1}$ to approximately ground, turning OFF the transistors 310, 314, and 318, and the feedforward level shifter 308 drives the boosted clock signal BCLK2 signal to approximately ground and thereby drives the corresponding terminal of the capacitor 350 to ground. In response to the low $\overline{CLK}$ signal and the control voltage on node 330, the feedforward level shifter 306 clocks the capacitor 348 with the boosted clock signal BCLK1 having the voltage developed on the node 332. Recall, the CLK signal is high so the voltage on the node 332 equals the high voltage of the CLK signal ($V_{CC}$) plus the voltage stored across the capacitor 344, which is much greater than the high voltage $V_{CC}$ of the CLK signal alone that would normally be used to clock the capacitor 348 in a conventional charge pump. Thus, by clocking the capacitor 348 with the BCLK1 signal having the high voltage equal to the voltage at the node 332, the voltage developed at the node 336 accordingly increases thereby increasing charge transferred from the capacitor 348 through the turned ON diode-coupled transistor 320 to the capacitor 350. In this way, by clocking the stage 360 with the boosted clock signal BCLK1 the voltage developed across the capacitor 350 is increased relative to a conventional stage clocked directly by the $\overline{\text{CLK}}$ signal.

During the odd-stage mode of operation, the feedback level shifter 304 drives the boosted gate signal $V_{BG2}$ to the voltage on the node 336. As previously described, the voltage on the node 336 equals the high voltage of the boosted clock signal BCLK1 plus the voltage across the capacitor 348, which is much greater than the supply voltage $V_{CC}$. In response to the high boosted gate signal $V_{BG2}$, the transistor 312 turns ON causing charge to flow from the capacitor 340 through the transistor 312 to the capacitor 342 and the transistor 316 turn ON causing charge to flow from the capacitor 344 through the transistor 316 to the capacitor 346. The boosted gate signal $V_{BG2}$ applied to the gates of the transistors 312 and 316 is sufficiently greater than the voltages developed on the nodes 324 and 332 to enable these transistors to pass the full values of these voltages. In this way, the effect of the respective threshold voltages threshold voltages $V_T$ of the transistors 312 and 316 do not reduce the maximum voltages passed by these transistors during operation of the charge pump circuit 300 during the odd-stage mode. From the above description, it is seen that during the odd-stage mode of operation, all of the odd-stages 352, 356, and 360 are activated and the capacitors of the adjacent even stages are charged.

The charge pump circuit 300 operates in the even-stage mode when the CLK signal goes low and the $\overline{\text{CLK}}$ signal goes high. During the even-stage mode of operation, the feedforward level shifter 306 drives the CLKB 1 signal to approximately ground, and the feedback level shifter 304 drives the boosted gate signal $V_{BG2}$ to approximately ground turning OFF the transistors 312 and 316. During the even-stage mode of operation, the feedforward level shifter 308 operates in the same way as previously described for the feedforward level shifter 306 during the odd-stage mode of operation. In other words, the level shifter 308 drives the boosted clock signal BCLK2 signal to a high voltage equal to the voltage on the node 334, which equals the high voltage ($V_{CC}$) of the $\overline{\text{CLK}}$ signal plus the voltage stored across the capacitor 346. This high voltage of the CLKB2 signal is significantly greater than the high voltage of the $\overline{\text{CLK}}$ signal and thus the charge transferred from the capacitor 350 through the diode-coupled transistor 322 increases and the maximum voltage to which the diode-coupled transistor 322 may charge the load capacitor $C_L$ increases accordingly.

During the even-stage mode, the feedback level shifter 302 operates in the same way as previously described for the feedback level shifter 304 during the odd-stage mode. More specifically, the level shifter 302 outputs the boosted gate signal $V_{BG1}$ having a high voltage equal to the voltage at the node 338, and this boosted gate signal $V_{BG1}$ is applied to the gates of the transistors 310, 314, and 318 turning ON these transistors. Once again, the high voltage of the boosted gate signal $V_{BG1}$ has a sufficient magnitude to eliminate the reduction of the respective passed voltages by the threshold voltages $V_T$ of the transistors 310, 314, and 318. For example, the high voltage of the boosted gate signal $V_{BG1}$ enables the transistor 314 to pass the full magnitude of the voltage at the node 330 to the node 332. From the above description, it is seen that during the even-stage mode of operation, the transistor 310 and all of the even-stages 354, 358, and 362 are activated and the capacitors of the adjacent odd stages are charged.

The charge pump circuit 300 enables the generation of a relatively high pumped output voltage $V_P$ from a low supply voltage $V_{CC}$ using a reduced number of voltage boosting stages. As previously described, as the supply voltage $V_{CC}$ becomes smaller, the values for the respective threshold voltage of the transistor in each stage limits the voltage gain of the pump circuit 300. The pump circuit 300 eliminates the effect of the threshold voltages of the MOS transistors 310–318, allowing the circuit to generate the boosted pump voltage $V_P$ at low supply voltages $V_{CC}$. In addition, by clocking the final two stages 360 and 362 with the boosted clock signals BCLK1 and BCLK2, respectively, the respective boosted voltages generated by each of these stages is increased thus reducing the number of stages in the charge pump circuit 300 required to generate the desired pumped output voltage $V_P$. In the embodiment of FIG. 3, the final two stages 360 and 362 include the diode-coupled transistors 320 and 322, respectively, but one skilled in the art will realize that level shifters could also be utilized to alleviate the impact of high threshold voltages of transistors 320 and 322 in each of these stages to increase the overall voltage gain of the charge pump circuit 300. One skilled in the art will realize that although the charge pump circuit 300 is shown as including NMOS transistors 310–322 for generating the positive pumped output voltage $V_P$, these transistors may be replaced with PMOS transistors to generate a negative pumped output voltage.

Figure 4:
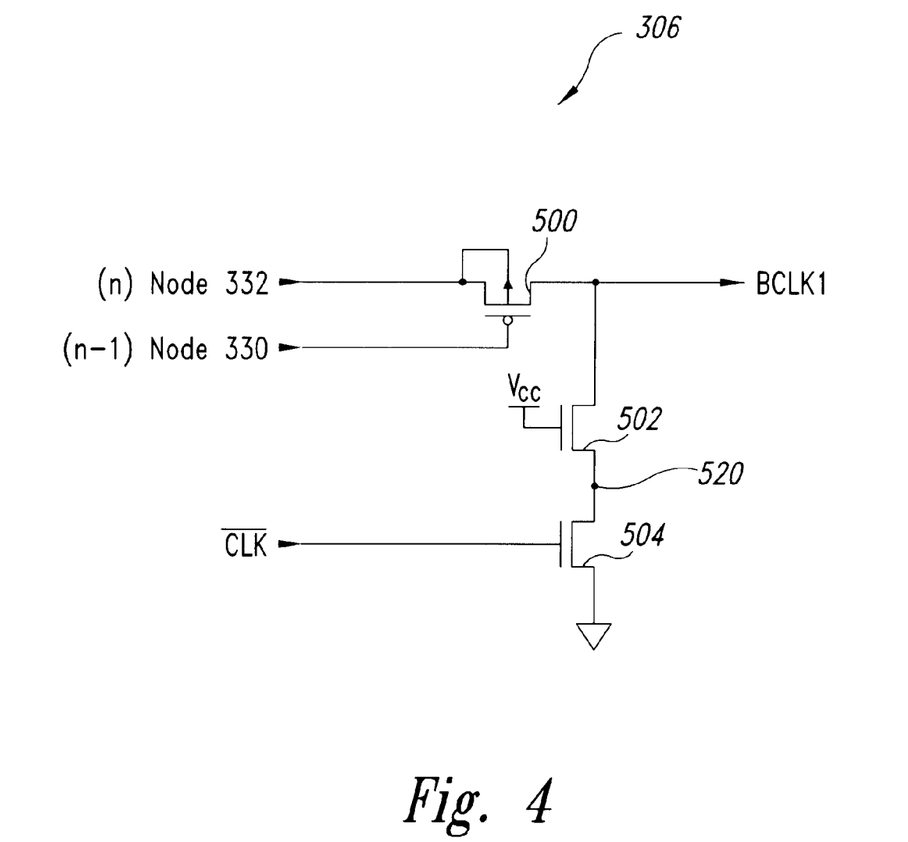
FIG. 4 is a schematic illustrating one embodiment of one of the level shifters of FIG. 3.

FIG. 4 is a schematic of one embodiment of the feedforward level shifter 306 of FIG. 3. Each of the level shifters 302–308 may be formed from the same circuitry, and thus, only the level shifter 306 will be described in more detail with reference to FIG. 4. The level shifter 306 includes a PMOS transistor 500 having its source coupled to the node 332 (see FIG. 3) and its gate coupled to the node 330 (see FIG. 3). As indicated, in general the source of the PMOS transistor 500 is connected to a node N and the gate to a node N-1 in the charge pump circuit 300. The substrate or body of the PMOS transistor 500 is coupled to its source to reduce the body effect of the transistor and thereby minimize its threshold voltage $V_T$. When the PMOS transistor 500 is turned ON, the transistor passes the voltage on the node 332 to its drain as the BCLK1 signal that is applied to the capacitor 348 (FIG. 3). An NMOS limiting transistor 502 and an NMOS activation transistor 504 receiving the $\overline{\text{CLK}}$ signal on its gate are coupled between the drain of the PMOS transistor 500 and ground. The transistor 502 has its gate connected to the supply voltage $V_{CC}$ and is utilized to limit the amplitude of the voltage swing at a node 520 during transition of the $\overline{\text{CLK}}$ signal. With this configuration, the drain-to-source voltage of the transistor 504 will not exceed $V_{CC}$ minus the threshold voltage of the transistor 502 when the $\overline{\text{CLK}}$ signal switches, resulting in less electric field across transistor 504 and less current flowing through this transistor. The transistor 502 in the level shifter 306 protects the transistor 504 from being damaged due to high electric field and high current when the $\overline{\text{CLK}}$ signal switches.

The operation of the level shifter 306 will now be described in more detail with reference to FIGS. 3 and 4. When the $\overline{\text{CLK}}$ signal is high, the transistor 504 turns ON coupling the drain of the PMOS transistor 500 to approximately ground through the load transistor 502 and thereby driving the voltage of the BCLK1 signal to approximately ground. When the $\overline{\text{CLK}}$ signal is low, the transistor 504 turns OFF, and the BCLK1 signal is isolated from ground. As a result, when node 332 (N) (FIG. 3) is driven high by the high CLK signal coupled through the capacitor 344, the transistor 500 is turned on by the significantly lower voltage coupled from node 330 (N-1), thereby coupling the high voltage on the node 332 to the BCLK1 signal. By coupling the gate and source of the PMOS transistor in this manner, existing voltages in the charge pump circuit 300 are utilized to control the level shifter 306. Recall that when the $\overline{CLK}$ signal is high, the charge pump circuit 300 operates in the even-stage mode, and that the charge pump circuit 300 commences operation in the odd-stage mode immediately after terminating operation in the even-stage mode. In the even-stage mode, the CLK and $\overline{CLK}$ signal are low and high, respectively, the transistor 314 is turned ON, and charge flows from the capacitor 342 through the transistor 314 to the capacitor 344. As a result, when the odd-stage mode commences with the CLK and $\overline{CLK}$ signal going high and low, respectively, the transistor 314 turns OFF and the voltage on the node 330 (i.e., the voltage across the capacitor 342) is sufficiently less than the voltage at the node 332 (i.e. voltage across the capacitor 344 plus the high voltage $V_{CC}$ of the CLK signal) to turn ON the PMOS transistor 500 and generate the BCLK1 signal having a high voltage equal to the voltage at the node 332. In this way, the level shifter 306 utilizes existing signals in the charge pump circuit 300 to develop the BCLK1 signal. It should be noted that if the gate of the PMOS transistor 500 were simply controlled by the $\overline{CLK}$ signal, the PMOS transistor 500 could undesirably turn ON even when the $\overline{CLK}$ signal is equal to the supply voltage $V_{CC}$ if the voltage on the node 332 became sufficiently large.

Figure 5:
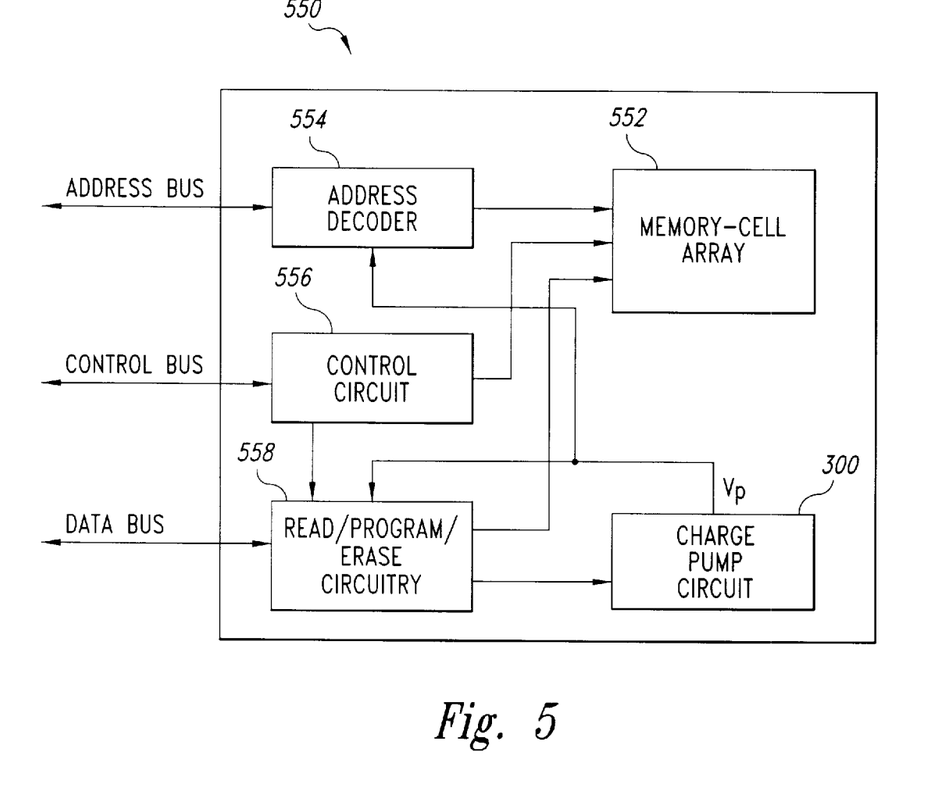
FIG. 5 is a functional block diagram of a FLASH memory including the charge pump circuit of FIG. 3.

FIG. 5 is a functional block diagram of an electrically erasable and programmable or FLASH memory 550 having an array 552 of FLASH cells (not shown), and including the charge pump circuit 300. The FLASH memory 550 includes an address decoder 554, control circuit 556, and read/program/erase circuitry 558 receiving signals on address, control, and data busses, respectively. All of the address decoder 554, control circuit 556, and circuitry 558 are conventional components, as understood by those skilled in the art. During programming, the control circuit 556 and read/program/erase circuitry 558 utilize the boosted voltage $V_P$ generated by the charge pump circuit 300 to provide the memory-cell array 552 with the required high voltage for programming FLASH memory cells in the array, as understood by those skilled in the art. The address decoder 554 decodes address signals applied on the address bus and utilizes the boosted voltage $V_P$ to access corresponding FLASH memory cells or blocks of memory cells in the array 552. The circuit 558 places read data from addressed cells in the array 552 onto the data bus during normal operation of the FLASH memory 550.

The operation and structure of the memory cells in the array 552 will now be briefly described although such operation and structure are understood by those skilled in the art. A FLASH memory cell, also called a floating gate transistor memory cell, is similar to a field effect transistor, having a channel region between a source and a drain and a control gate over the channel region. In addition, the FLASH cell has a floating gate between the control gate and the channel region. The floating gate is separated from the channel region by a layer of gate oxide, and an interpoly dielectric layer separates the control gate from the floating gate. Both the control gate and the floating gate are formed of doped polysilicon, and the floating gate remains floating or electrically isolated. A FLASH memory cell is programmed by applying appropriate voltages to the control gate, drain, and source, causing electrons to pass from the channel region to the floating gate through the gate oxide. The voltage applied to the control gate determines the amount of charge residing on the floating gate after programming, and the charge determines the voltage that must be applied to the control gate in order to allow the FLASH memory cell to conduct current between the source and the drain. As charge is added to the floating gate, the threshold voltage of the FLASH memory cell increases. To erase a FLASH cell, electrons placed on the floating gate by programming must be removed. This is done by applying appropriate voltages to the control gate, drain, and source of the FLASH cell. As charge is pulled from the floating gate the threshold voltage of the FLASH memory cell decreases. To read the data stored in the FLASH memory cell, i.e., to distinguish between a programmed cell and an erased cell, a bias condition for a read is placed on the memory cell and the data is sensed according to the threshold voltage of the FLASH memory cell or the cell current the cell under this bias condition.

Figure 6:
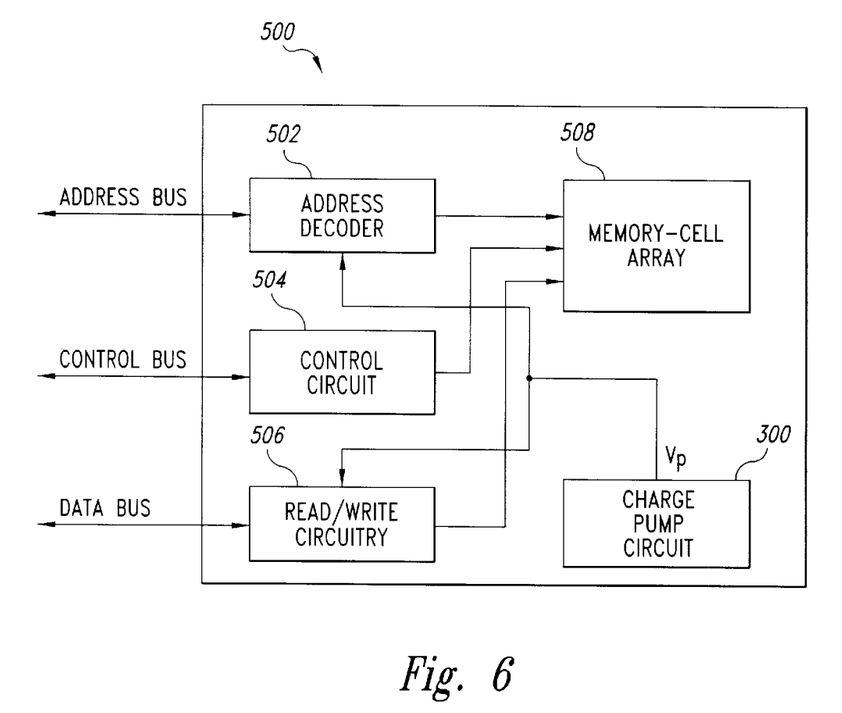
FIG. 6 is a functional block diagram of a DRAM including the charge pump circuit of FIG. 3.

FIG. 6 is a block diagram of a dynamic random access memory ("DRAM") 500 including the charge pump circuit 300 of FIG. 3. The DRAM 500 includes an address decoder 502, control circuit 504, and read/write circuitry 506, all of which are conventional. The address decoder 502, control circuit 504, and read/write circuitry 506 are all coupled to a memory-cell array 508. In addition, the address decoder 502 is coupled to an address bus, the control circuit 504 is coupled to a control bus, and the read/write circuit 506 is coupled to a data bus. The pumped output voltage $V_P$ from the charge pump circuit 300 may be applied to a number of components within the DRAM 500, as understood by those skilled in the art. In the DRAM 500, the charge pump circuit 300 applies the pumped output voltage $V_P$ to the read/write circuitry 506, which may utilize this voltage in a data buffer (not shown) to enable that buffer to transmit or receive full logic level signals on the data bus. The charge pump circuit 300 also applies the voltage $V_P$ to the address decoder 502 which, in turn, may utilize the voltage to apply boosted word line voltages to the array 508. In operation, external circuitry, such as a processor or memory controller, applies address, data, and control signals on the respective busses to transfer data to and from the DRAM 500.

Although the charge pump circuit 300 is shown in the FLASH memory 550 and DRAM 500, one skilled in the art will realize the charge pump circuit 300 may be utilized in any type of integrated circuit requiring a pumped voltage, including other types of nonvolatile and volatile memory devices such as SDRAMs, SRAMs, and packetized memory devices like the SLDRAM. When contained in a FLASH memory, the charge pump circuit 300 would typically generate a boosted programming voltage that is utilized to program data into nonvolatile memory cells in the array 552, as understood by those skilled in the art. To erase the data stored in a block of memory cells in an array in a FLASH memory, the external circuitry applies the appropriate signals on the respective busses, and a block erase circuit applies the pumped output voltage $V_P$ from the pump circuit 300 to erase data stored in blocks of memory cells, as will be understood by one skilled in the art. The charge pump circuit 300 may be utilized in FLASH memories powered by low supply voltages $V_{CC}$ because, as previously described, the charge pump circuit 300 can generate the pumped output voltage $V_P$ having a magnitude great enough to properly erase the data stored in the memory cells.

Figure 7:
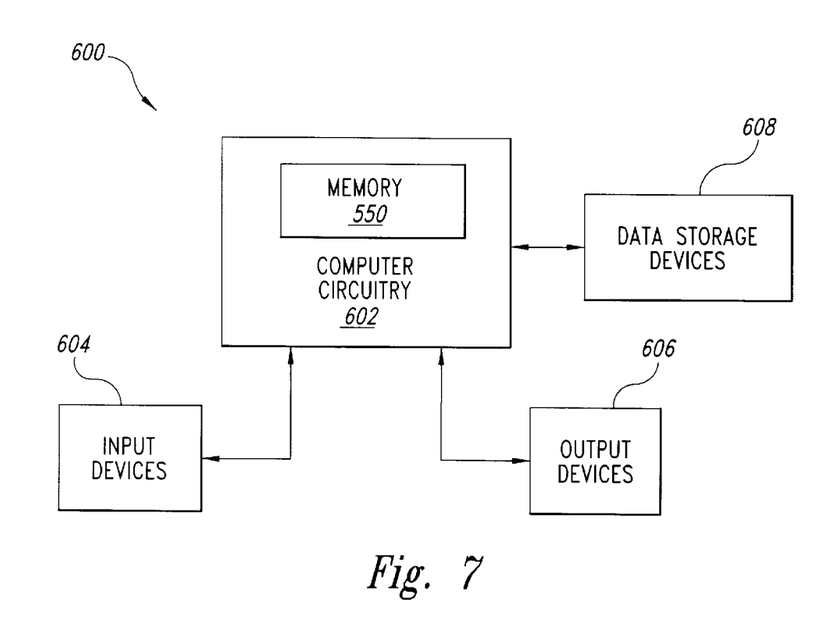
FIG. 7 is a functional block diagram of a computer system including the FLASH memory of FIG. 5.

FIG. 7 is a block diagram of a computer system 600 including computing circuitry 602 that contains the FLASH memory 550 of FIG. 5. The computing circuitry 602 could also contain the DRAM 500, or both the DRAM 500 and FLASH memory 550, as will be understood by those skilled in the art. The computing circuitry 602 performs various computing functions, such as executing specific software to perform specific calculations or tasks. In addition, the computer system 600 includes one or more input devices 604, such as a keyboard or a mouse, coupled to the computer circuitry 602 to allow an operator to interface with the computer system. Typically, the computer system 600 also includes one or more output devices 606 coupled to the computer circuitry 602, such output devices typically being a printer or a video terminal. One or more data storage devices 608 are also typically coupled to the computer circuitry 602 to store data or retrieve data from external storage media (not shown). Examples of typical storage devices 608 include hard and floppy disks, tape cassettes, and compact disc read-only memories (CD-ROMs). The computer circuitry 602 is typically coupled to the memory device 500 through appropriate address, data, and control busses to provide for writing data to and reading data from the memory device.

It is to be understood that even though various embodiments and advantages of the present invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A charge pump circuit, comprising:
    a plurality of switching circuits, each switching circuit including first and second signal terminals and a control terminal adapted to receive a control signal, the switching circuit coupling its first signal terminal to its second signal terminal responsive to the control signal, and the signal terminals of the plurality of switching circuits being connected in series between an input voltage node and an output voltage node;
    a plurality of energy storage circuits, each energy storage circuit having a first terminal coupled to a respective voltage node formed by the interconnection between adjacent switching circuits and having a second terminal adapted to receive a clocking signal, and each energy storage circuit developing a voltage across its first and second terminals that is a function of energy stored in the circuit; and
    at least one feedback level shifting circuit coupled between a selected one of the voltage nodes and the control terminal included in a switching circuit coupled between the selected voltage node and the input node, the at least one feedback level shifting circuit applying a voltage derived from the voltage on the voltage node to the control terminal responsive to a clock signal.

2. The charge pump circuit of claim 1 wherein each of the plurality of switching circuits comprises an NMOS transistor.

3. The charge pump circuit of claim 1 wherein the at least one feedback level shifter comprises:
    a voltage switching circuit coupled between the voltage node and the control terminal and having an activation terminal coupled to the adjacent voltage node nearer the input node, the voltage switching circuit operable to apply the voltage on the voltage node to the control terminal responsive to the voltage on the adjacent voltage node; and
    an enable circuit coupled between the control terminal and a reference voltage source and having a control terminal coupled to receive the clock signal, the enable circuit operable to couple the control terminal to the reference voltage source responsive to the clock signal going active and isolating the control terminal from the reference voltage source responsive to the clock signal going inactive.

4. The charge pump circuit of claim 3 wherein the voltage switching circuit comprises a PMOS transistor having its substrate connected to its source.

5. The charge pump circuit of claim 3 wherein the enable circuit comprises:
    a limiting element having first and second terminals, the first terminal being coupled to the control terminal, the limiting element operable to limit the voltage on its second terminal relative to to the reference voltage applied to an enable transistor,
    the enable transistor having signal terminals coupled between the second terminal of the limiting element and a reference voltage source and having a control terminal coupled to receive the clock signal.

6. The charge pump circuit of claim 5 wherein the limiting element comprises an NMOS transistor having its gate coupled to a supply voltage source, the NMOS transistor limiting the voltage across the signal terminals of the enable transistor to the supply voltage minus a threshold voltage of the NMOS transistor.

7. The charge pump circuit of claim 1 wherein each of the energy storage circuits comprises a capacitor.

8. The charge pump of claim 1 wherein at least one of the switching circuits comprises a MOS transistor having its gate coupled to its drain to form a diode-coupled transistor.

9. A charge pump circuit, comprising:
    a plurality of switching circuits, each switching circuit including first and second signal terminals and a control terminal adapted to receive a control signal, the switching circuit coupling its first signal terminal to its second signal terminal responsive to the control signal, and the signal terminals of the plurality of switching circuits being connected in series between an input voltage node and an output voltage node;
    a plurality of energy storage circuits, each energy storage circuit having a first terminal coupled to a respective voltage node formed by the interconnection between adjacent switching circuits and having a second terminal adapted to receive a clocking signal, and each energy storage circuit developing a voltage across its first and second terminals that is a function of energy stored in the circuit; and
    at least one feedforward level shifting circuit coupled between a selected one of the voltage nodes and a second terminal that belongs to one of the energy storage circuits coupled to a voltage node between the selected voltage node and the output node, the at least one feedforward level shifting circuit applying a voltage derived from the voltage on the voltage node to the second terminal responsive to a clock signal.

10. The charge pump circuit of claim 9 wherein each of the plurality of switching circuits comprises an NMOS transistor.

11. The charge pump circuit of claim 9 wherein the at least one feedforward level shifter comprises:
    a voltage switching circuit coupled between the voltage node and second terminal of energy storage circuit and having an activation terminal coupled to the adjacent voltage node nearer the input node, the voltage switching circuit operable to apply the voltage on the voltage node to the second terminal of the energy storage circuit responsive to the voltage on the adjacent voltage node; and an enable circuit coupled between the second terminal of the energy storage circuit and a reference voltage source and having a control terminal coupled to receive the clock signal, the enable circuit operable to couple the second terminal of the energy storage circuit to the reference voltage source responsive to the clock signal going active and isolating the second terminal from the reference voltage source responsive to the clock signal going inactive.

12. The charge pump circuit of claim 11 wherein the voltage switching circuit comprises a PMOS transistor having its substrate connected to its source.

13. The charge pump circuit of claim 11 wherein the enable circuit comprises:

a limiting element having first and second terminals, the first terminal being coupled to the second terminal of the energy storage circuit and the limiting element operable to limit the voltage on its second terminal relative to the reference voltage applied to an enable transistor, the enable transistor having signal terminals coupled between the second terminal of the limiting element and a reference voltage source and having a control terminal coupled to receive the clock signal.

14. The charge pump circuit of claim 13 wherein the limiting element comprises an NMOS transistor having its gate coupled to a supply voltage source, the NMOS transistor limiting the voltage across the signal terminals of the enable transistor to the supply voltage minus a threshold voltage of the NMOS transistor.

15. The charge pump circuit of claim 9 wherein each of the energy storage circuits comprises a capacitor.

16. The charge pump of claim 9 wherein at least one of the switching circuits comprises a MOS transistor having its gate coupled to its drain to form a diode-coupled transistor.

17. A charge pump circuit, comprising:

a plurality of switching circuits, each switching circuit including first and second signal terminals and a control terminal adapted to receive a control signal, the switching circuit coupling its first signal terminal to its second signal terminal responsive to the control signal, and the signal terminals of the plurality of switching circuits being connected in series between an input voltage node and an output voltage node;

a plurality of energy storage circuits, each energy storage circuit having a first terminal coupled to a respective voltage node formed by the interconnection between adjacent switching circuits and having a second terminal adapted to receive a clocking signal, and each energy storage circuit developing a voltage across its first and second terminals that is a function of energy stored in the circuit;

at least one feedback level shifting circuit coupled between a selected one of the voltage nodes and the control terminal included in a switching circuit coupled between the selected voltage node and the input node, the at least one feedback level shifting circuit applying a voltage derived from the voltage on the voltage node to the control terminal responsive to a clock signal; and at least one feedforward level shifting circuit coupled between a selected one of the voltage nodes and a second terminal that belongs to one of the storage circuits coupled to a voltage node between the selected voltage node and the output node, the at least one feedforward level shifting circuit applying a voltage derived from the voltage on the voltage node to the second terminal responsive to a clock signal.

18. The charge pump circuit of claim 17 wherein each of the plurality of switching circuits comprises an NMOS transistor.

19. The charge pump circuit of claim 17 wherein each of the energy storage circuits comprises a capacitor.

20. The charge pump circuit of claim 17 wherein the at least one feedforward level shifter comprises:

a voltage switching circuit coupled between the voltage node and second terminal of the storage circuit and having an activation terminal coupled to the adjacent voltage node nearer the input node, the voltage switching circuit operable to apply the voltage on the voltage node to the second terminal of the energy storage circuit responsive to the voltage on the adjacent voltage node; and an enable circuit coupled between the second terminal of the energy storage circuit and a reference voltage source and having a control terminal coupled to receive the clock signal, the enable circuit operable to couple the second terminal of the energy storage circuit to the reference voltage source responsive to the clock signal going active and isolating the second terminal from the reference voltage source responsive to the clock signal going inactive.

21. The charge pump circuit of claim 20 wherein the voltage switching circuit comprises a PMOS transistor having its substrate connected to its source.

22. The charge pump circuit of claim 20 wherein the enable circuit comprises:

a limiting element having first and second terminals, the first terminal coupled to the second terminal of the energy storage circuit and the limiting element operable to limit the voltage on its second terminal relative to the reference voltage applied to an enable transistor, the enable transistor having signal terminals coupled between the second terminal of the limiting element and a reference voltage source and having a control terminal coupled to receive the clock signal.

23. The charge pump circuit of claim 22 wherein the limit element comprises an NMOS transistor having its gate coupled to a supply voltage source, the NMOS transistor limiting the voltage across the signal terminals of the enable transistor to the supply voltage minus a threshold voltage of the NMOS transistor.

24. The charge pump of claim 17 wherein at least one of the switching circuits comprises a MOS transistor having its gate coupled to its drain to form a diode-coupled transistor.

25. The charge pump circuit of claim 17 wherein the at least one feedback level shifter comprises:

a voltage switching circuit coupled between the voltage node and the control terminal and having an activation terminal coupled to the adjacent voltage node nearer the input node, the voltage switching circuit operable to apply the voltage on the voltage node to the control terminal responsive to the voltage on the adjacent voltage node; and an enable circuit coupled between the control terminal and a reference voltage source and having a control terminal coupled to receive the clock signal, the enable circuit operable to couple the control terminal to the reference voltage source responsive to the clock signal going active and isolating the control terminal from the reference voltage source responsive to the clock signal going inactive.

26. The charge pump circuit of claim 25 wherein the voltage switching circuit comprises a PMOS transistor having its substrate connected to its source.

27. The charge pump circuit of claim 25 wherein the enable circuit comprises:

a limiting element having first and second terminals, the first terminal being coupled to the control terminal and the limiting element operable to limit the voltage on its second terminal relative to the reference voltage applied to an enable transistor, the enable transistor having signal terminals coupled between the second terminal of the limiting element and a reference voltage source and having a control terminal coupled to receive the clock signal.

28. The charge pump circuit of claim 27 wherein the limiting element comprises an NMOS transistor having its gate coupled to a supply voltage source, the NMOS transistor limiting the voltage across the signal terminals of the enable transistor to the supply voltage minus a threshold voltage of the NMOS transistor.

29. A charge pump circuit, comprising:

N switching circuits, each switching circuit having first and second signal terminals and a control terminal adapted to receive a control signal, the switching circuit operable to couple the first signal terminal to a second signal terminal responsive to the control signal, the signal terminals of the N switching circuits being connected in series between an input node and an output node;

N-1 energy storage circuits, each energy storage circuit having a first terminal coupled to one of N-1 voltage nodes formed by respective interconnections between switching circuits, and each energy storage circuit having a clocking terminal adapted to receive a clocking signal;

at least one feedback level shifting circuit coupled between a selected voltage node and the control terminal included in at least one of the switching circuits coupled between the selected voltage node and the input node, the at least one feedback level shifting circuit applying a voltage derived from the voltage on the selected voltage node to the control terminal responsive to a clock signal; and at least one feedforward level shifting circuit coupled between a selected voltage node and a clocking terminal that belongs to a respective energy storage circuit coupled to a voltage node between the selected voltage node and the output node, the at least one feedforward level shifting circuit applying a voltage derived from the voltage on the selected voltage node to the clocking terminal responsive to a clock signal.

30. The charge pump circuit of claim 29 comprising seven switching circuits, six energy storage circuits, a first feedback level shifting circuit coupled between the sixth voltage node and the control terminals of the first, third, and fifth switching circuits, a second feedback level shifting circuit coupled between the fifth voltage node and the control terminals of the second and fourth transistors, a first feedforward level shifting circuit coupled between the third voltage node and the clocking terminal of the storage circuit coupled to the fifth voltage node, and a second feedforward level shifting circuit coupled between the fourth voltage node and the clocking terminal of the storage circuit coupled to the sixth voltage node.

31. The charge pump circuit of claim 30 wherein clocking terminals of the energy storage circuits coupled to the first and third voltage nodes, the first feedback and second feedforward level shifting circuits are clocked with a first clock signal, and the clocking terminals of the energy storage circuits coupled to the second and fourth voltage nodes, the second feedback and first feedforward level shifting circuits are clocked with a first complementary clock signal.

32. The charge pump circuit of claim 29 wherein the at least one feedback level shifter comprises:

a voltage switching circuit coupled between the selected voltage node and each of the control terminals and having an activation terminal coupled to the adjacent voltage node between the selected voltage node and the input node, the voltage switching circuit applying the voltage on the selected voltage node to each of the control terminals responsive to the voltage on the adjacent voltage node; and an enable circuit coupled between each of the control terminals and a reference voltage source and having a control terminal coupled to receive the clock signal, the enable circuit operable to couple each of the control terminals to the reference voltage source responsive to the clock signal going active and isolating the control terminal from the reference voltage source responsive to the clock signal going inactive.

33. The charge pump circuit of claim 32 wherein the voltage switching circuit comprises a PMOS transistor having its substrate connected to its source.

34. The charge pump circuit of claim 32 wherein the enable circuit comprises:

a limiting element having first and second terminals, the first terminal being coupled to each of the control terminals, the limiting element operable to limit the voltage on its second terminal relative to the reference voltage applied to an enable transistor, the enable transistor having signal terminals coupled between the second terminal of the limiting element and a reference voltage source and having a control terminal coupled to receive the clock signal.

35. The charge pump circuit of claim 34 wherein the limiting element comprises an NMOS transistor having its gate coupled to a supply voltage source, the NMOS transistor limiting the voltage across the signal terminals of the enable transistor to the supply voltage minus a threshold voltage of the NMOS transistor.

36. The charge pump circuit of claim 29 wherein the at least one feedforward level shifter comprises:

a voltage switching circuit coupled between the selected voltage node and the clocking terminal of the energy storage circuit and having an activation terminal coupled to the adjacent voltage node between the selected voltage node and the input node, the voltage switching circuit operable to apply the voltage on the selected voltage node to the clocking terminal of the energy storage circuit responsive to the voltage on the adjacent voltage node; and an enable circuit coupled between the clocking terminal of the energy storage circuit and a reference voltage source and having a control terminal coupled to receive the clock signal, the enable circuit operable to couple the clocking terminal of the energy storage circuit to the reference voltage source responsive to the clock signal going active and isolating the second terminal from the reference voltage source responsive to the clock signal going inactive.

37. A FLASH memory device, comprising:
an address bus;
a control bus;
a data bus;
an address decoder coupled to the address bus;
a read/programming circuit coupled to the data bus;
a memory-cell array coupled to the address decoder, control circuit, and read/programming circuit, the array including a plurality of the flash memory cells; and
a charge pump circuit that generates a voltage on an output voltage node coupled to at least one of the address decoder, array, and read/programming circuit, comprising,
plurality of switching circuits, each switching circuit including first and second signal terminals and a control terminal adapted to receive a control signal, the switching circuit coupling its first signal terminal to its second signal terminal responsive to the control signal, and the signal terminals of the plurality of switching circuits being connected in series between an input voltage node and the output voltage node;
a plurality of energy storage circuits, each energy storage circuit having a first terminal coupled to a respective voltage node formed by the interconnection between adjacent switching circuits and having a second terminal adapted to receive a clocking signal, and each energy storage circuit developing a voltage across its first and second terminals that is a function of energy stored in the circuit;
at least one feedback level shifting circuit coupled between a selected one of the voltage nodes and the control terminal included in a switching circuit coupled between the selected voltage node and the input node, the at least one feedback level shifting circuit applying the voltage on the voltage node to the control terminal responsive to a clock signal; and
at least one feedforward level shifting circuit coupled between a selected one of the voltage nodes and a second terminal that belongs to one of the energy storage circuits coupled to a voltage node between the selected voltage node and the output node, the at least one feedforward level shifting circuit applying the voltage on the voltage node to the second terminal responsive to a clock signal; and
a control circuit coupled to the control bus, the control circuit operable during a programming mode to control the address decoder, read/programming circuit, and memory-cell array to program data into flash memory cells in the array.

38. The FLASH memory device of claim 37 wherein the control circuit operates during the programming mode to program data into blocks of FLASH memory cells in the array.

39. A memory device, comprising:
an address bus;
a control bus;
a data bus;
an address decoder coupled to the address bus;
a read/write circuit coupled to the data bus;
a memory-cell array coupled to the address decoder, control circuit, and read/write circuit; and
a charge pump circuit that generates a voltage on an output voltage node for use by the memory device comprising,
plurality of switching circuits, each switching circuit including first and second signal terminals and a control terminal adapted to receive a control signal, the switching circuit coupling its first signal terminal to its second signal terminal responsive to the control signal, and the signal terminals of the plurality of switching circuits being connected in series between an input voltage node and the output voltage node;
a plurality of energy storage circuits, each energy storage circuit having a first terminal coupled to a respective voltage node formed by the interconnection between adjacent switching circuits and having a second terminal adapted to receive a clocking signal, and each energy storage circuit developing a voltage across its first and second terminals that is a function of energy stored in the circuit;
at least one feedback level shifting circuit coupled between a selected one of the voltage nodes and the control terminal included in a switching circuit coupled between the selected voltage node and the input node, the at least one feedback level shifting circuit applying the voltage on the voltage node to the control terminal responsive to a clock signal; and
at least one feedforward level shifting circuit coupled between a selected one of the voltage nodes and a second terminal that belongs to one of the energy storage circuits coupled to a voltage node between the selected voltage node and the output node, the at least one feedforward level shifting circuit applying the voltage on the voltage node to the second terminal responsive to a clock signal; and
a control circuit coupled to the charge pump and to the control bus, the control circuit developing clock signals to control operation of the charge pump and apply the voltage at the output voltage node to at least one of the address decoder, read/write circuit, and memory-cell array, and the control circuit developing control signals to control the address decoder, read/write circuit, and memory-cell array.

40. The memory device of claim 39 wherein the memory device comprises a dynamic random access memory.

41. A computer system, comprising:
a data input device;
a data output device; and
a processor coupled to the data input and output devices, the processor including a memory device comprising,
an address bus;
a control bus;
a data bus;
an address decoder coupled to the address bus;
a read/programming circuit coupled to the data bus;
a memory-cell array coupled to the address decoder, control circuit, and read/programming circuit, the array including a plurality of the FLASH memory cells; and
a charge pump circuit that generates a voltage on an output voltage node coupled to at least one of the address decoder, array, and read/programming circuit, comprising,
plurality of switching circuits, each switching circuit including first and second signal terminals and a control terminal adapted to receive a control signal, the switching circuit coupling its first signal terminal to its second signal terminal responsive to the control signal, and the signal terminals of the plurality of switching circuits being connected in series between an input voltage node and the output voltage node;

a plurality of energy storage circuits, each energy storage circuit having a first terminal coupled to a respective voltage node formed by the interconnection between adjacent switching circuits and having a second terminal adapted to receive a clocking signal, and each energy storage circuit developing a voltage across its first and second terminals that is a function of energy stored in the circuit;

at least one feedback level shifting circuit coupled between a selected one of the voltage nodes and the control terminal included in a switching circuit coupled between the selected voltage node and the input node, the at least one feedback level shifting circuit applying the voltage on the voltage node to the control terminal responsive to a clock signal; and at least one feedforward level shifting circuit coupled between a selected one of the voltage nodes and a second terminal that belongs to one of the energy storage circuits coupled to a voltage node between the selected voltage node and the output node, the at least one feedforward level shifting circuit applying the voltage on the voltage node to the second terminal responsive to a clock signal; and a control circuit coupled to the control bus, the control circuit operable during a programming mode to control the address decoder, read/programming circuit, and memory-cell array to program data into FLASH memory cells in the array.

42. The computer system of claim 41 wherein The FLASH memory device of claim 37 wherein the control circuit operates during the programming mode to program data into blocks of FLASH memory cells in the array.

43. A computer system, comprising:

a data input device;

a data output device; and a processor coupled to the data input and output devices, the processor including a memory device comprising, an address bus;

a control bus;

a data bus;

an address decoder coupled to the address bus;

a read/write circuit coupled to the data bus;

a memory-cell array coupled to the address decoder, control circuit, and read/write circuit; and a charge pump circuit that generates a voltage on an output voltage node for use by the memory device, comprising, plurality of switching circuits, each switching circuit including first and second signal terminals and a control terminal adapted to receive a control signal, the switching circuit coupling its first signal terminal to its second signal terminal responsive to the control signal, and the signal terminals of the plurality of switching circuits being connected in series between an input voltage node and the output voltage node;

a plurality of energy storage circuits, each energy storage circuit having a first terminal coupled to a respective voltage node formed by the interconnection between adjacent switching circuits and having a second terminal adapted to receive a clocking signal, and each energy storage circuit developing a voltage across its first and second terminals that is a function of energy stored in the circuit;

at least one feedback level shifting circuit coupled between a selected one of the voltage nodes and the control terminal included in a switching circuit coupled between the selected voltage node and the input node, the at least one feedback level shifting circuit applying the voltage on the voltage node to the control terminal responsive to a clock signal; and at least one feedforward level shifting circuit coupled between a selected one of the voltage nodes and a second terminal that belongs to one of the energy storage circuits coupled to a voltage node between the selected voltage node and the output node, the at least one feedforward level shifting circuit applying the voltage on the voltage node to the second terminal responsive to a clock signal; and a control circuit coupled to the charge pump and to the control bus, the control circuit developing clock signals to control operation of the charge pump and apply the voltage at the output voltage node to at least one of the address decoder, read/write circuit, and memory-cell array, and the control circuit developing control signals to control the address decoder, read/write circuit, and memory-cell array.

* * * * *

UNITED STATES PATENT AND TRADEMARK OFFICE
CERTIFICATE OF CORRECTION

PATENT NO. : 6,160,723
DATED : December 12, 2000
INVENTOR(S) : Tz-yi Liu

It is certified that error appears in the above-identified patent and that said Letters Patent is hereby corrected as shown below:

Title page,
Item [56], References Cited, OTHER PUBLICATIONS, please add
-- Tanzawa et al., "Circuit Technologies for a Single-1.8V Flash Memory," in *Symposium on VLSI Circuits Digest of Technical Papers*, Microelectronics Engineering Laboratory, Toshiba Corporation, Yokohama, Japan, pp. 63-64, June 1997.--
-- Choi et al., "Floating-Well Charge Pump Circuits for Sub-2.0V Single Power Supply Flash Memories," in *Symposium on VLSI Circuits Digest of Technical Papers*, Memory Division, Samsung Electronics Co., LTD, Kiheung, Korea, pp. 61-62, June 1997. --
-- Mihara et al., "Negative Heap Pump for Low Voltage Operation Flash Memory," in *Symposium on VLSI Circuits Digest of Technical Papers*, ULSI Laboratory, Mitsubishi Electric Corporation, Hyogo Japan, pp. 76-77, June 1996. --
-- Sawada et al., "An On-Chip High-Voltage Generator Circuit for EEPROMs with a Power Supply Voltage below 2V, in *Symposium on VLSI Circuits Digest of Technical Papers*, Nippon Steel Corporation, Kanagawa, Japan, pp. 75-76 June 1995. --
-- Wu et al., "Low Supply Voltage CMOS Charge Pumps," in *Symposium on VLSI Circuits Digest of Technical Papers*, Department of Electronics Engineering and Macronix International Co. Ltd., Hsin-Shu, Taiwan, pp. 81-82, June 1997. --
-- Wu et al., "1.2V CMOS Switched-Capacitor Circuits," in *ISSCC96 SESSION 24 DIALOG TECHNIQUES PAPER SP24.4*, February 1996. --
-- 256K x 8 BOOT BLOCK FLASH MEMORY, in Micron Quantum Devices, Inc., pp. 1-1 through 1-27, January 1997. --

Signed and Sealed this

Twenty-fourth Day of September, 2002

*Attest:*

*Attesting Officer*

JAMES E. ROGAN
*Director of the United States Patent and Trademark Office*